Nov. 17, 1931.  L. M. WOLF  1,832,679
ROTARY ENGINE
Filed Dec. 1, 1928   2 Sheets-Sheet 1

INVENTOR.
Leslie M Wolf
BY John E. Hubbell
ATTORNEY

Nov. 17, 1931. L. M. WOLF 1,832,679
ROTARY ENGINE
Filed Dec. 1, 1928 2 Sheets-Sheet 2
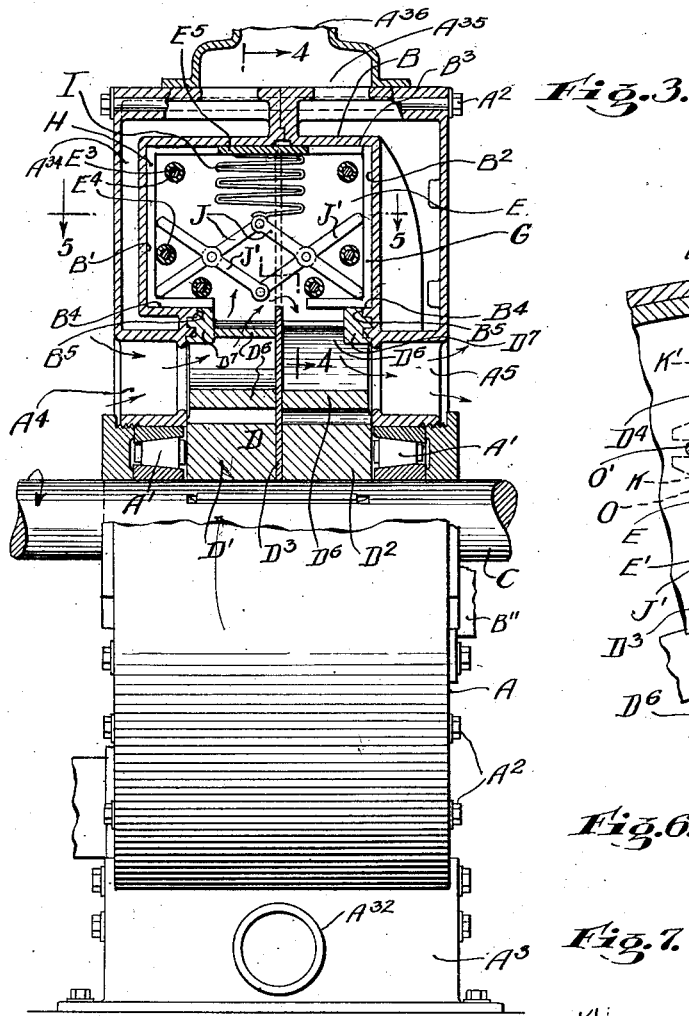
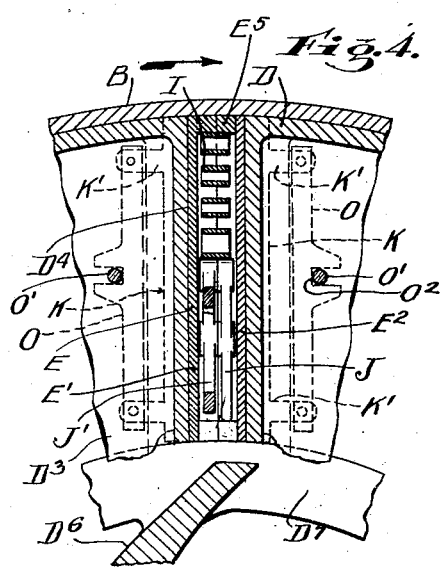
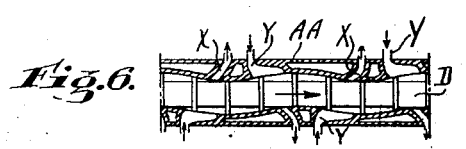
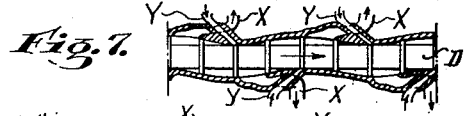
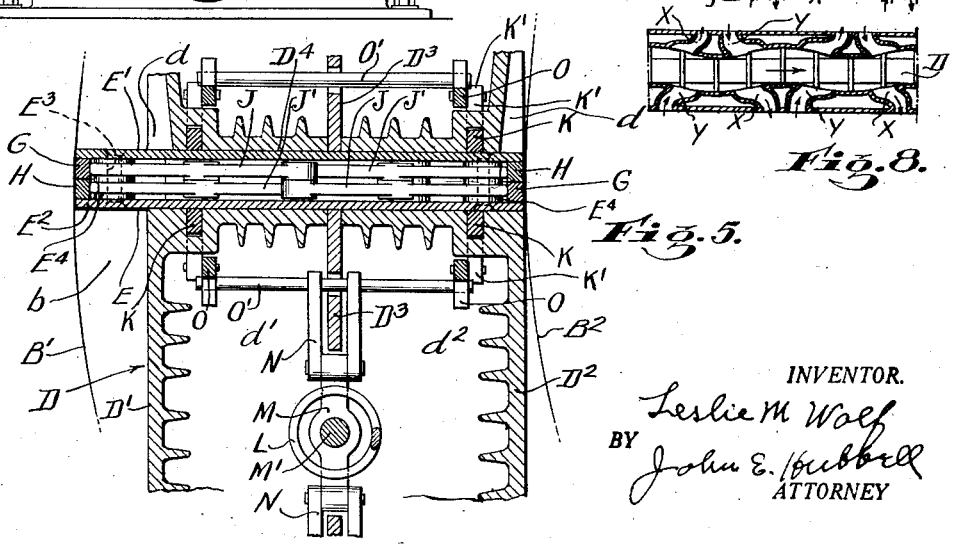
INVENTOR.
Leslie M. Wolf
BY John E. Hubbell
ATTORNEY Patented Nov. 17, 1931

1,832,679

UNITED STATES PATENT OFFICE

LESLIE MILTON WOLF, OF LOS ANGELES, CALIFORNIA

ROTARY ENGINE

Application filed December 1, 1928. Serial No. 322,985.

The general object of the present invention is to provide a rotary engine of improved construction and operative characteristics. More specifically stated, the general object of the invention is to provide improvements in an engine of the type comprising a rotor revolving in a piston chamber and provided with sliding piston members cooperating with the body of the rotor and the walls of the piston chamber to provide working chambers varying in volume as the rotative movement of the rotor proceeds, and in which a working fluid may be expanded and give out energy to the rotor, or may be compressed by energy absorbed from the rotor.

The invention was primarily devised for use in rotary internal combustion or explosion engines, and in such use each working chamber, formed by the rotor, an adjacent pair of sliding piston members and the piston chamber walls, serves as an explosion chamber in which liquid or gaseous fuel may be ignited and burned after an initial compression of the fuel and air charge in said working chamber. The invention is characterized by certain novel characteristics particularly adapted for use in an explosion engine of the so-called Diesel type, or analogous types in which the fuel and air charge is compressed to a relatively high pressure before ignition. Features of my invention may be used, however, in prime movers driven by steam or compressed air, as well as by gaseous products of combustion, and may also be used in gas compressors, and certain novel characteristics or features of the invention are also adapted for use in high speed rotary liquid pumps. In general, the different uses suggested require no change in the character of the apparatus, or in its general form except in respect to the means for supplying fluid to, and discharging fluid from, the apparatus.

My improved engine is characterized in particular by the special undulatory form given to opposing side walls of the piston chamber, and contributing to operation at high rotative speeds, without objectionable leakage between the relatively movable piston, rotor and piston chamber walls and with a relatively small amount of friction and wear.

The invention is further characterized by special features of construction and arrangement of parts provided for effectively sealing the joints between the relatively movable piston, rotor and piston wall parts.

The invention is further characterized by features of construction and arrangement contributing to the production of a rotor of relatively small weight but of ample strength and rigidity, and also by provisions made for cooling the pistons and rotor body, such provisions being of especial importance when the invention is incorporated in an explosion or internal combustion engine.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of my invention.

Of the drawings:

Fig. 3 is an elevation taken at right angles to Fig. 1 with the upper portion in section on the line 3—3 of Fig. 1;

Fig. 4 is a partial section on the line 4—4 of Fig. 3;

Fig. 5 is a partial section on the line 5—5 of Fig. 3;

Fig. 6 is a diagram generally similar in character to Fig. 2 illustrating a port arrangement suitable for use in a compressor;

Fig. 7 is a view similar to Fig. 6 illustrating a port arrangement suitable for use in a turbine; and Fig. 8 is a view similar to Fig. 6 illustrating a port arrangement suitable for use in a liquid pump.

Figure 1:
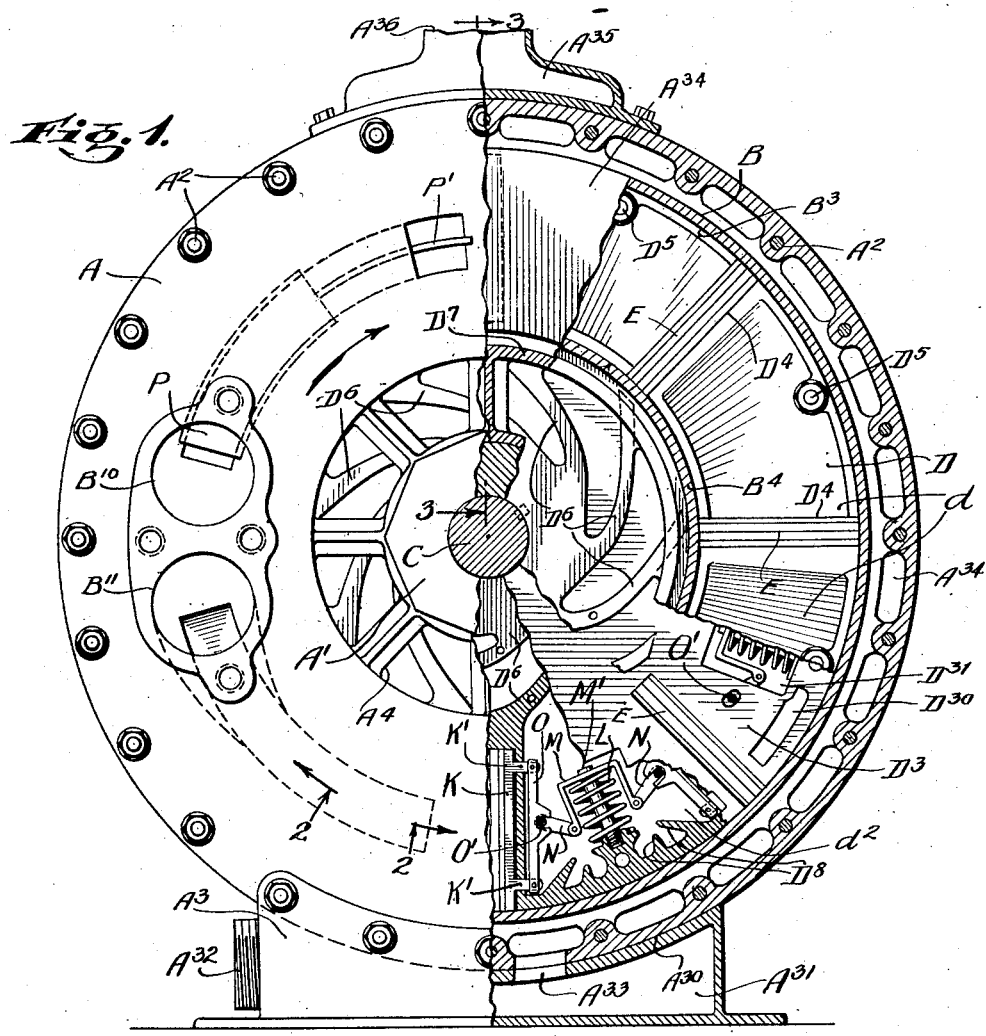
Fig. 1 is an elevation with portions of the engine broken away and in section.

In the drawings I have illustrated an embodiment of my invention, especially devised and adapted for use as a rotary explosion or internal combustion engine. The engine shown in the drawings comprises a stationary stator casing or housing formed with bearings A' for the rotor shaft C and with an annular piston chamber B encircling the shaft C. The opposite side walls B' and B² of the chamber are undulatory each comprising a series of alternating suitably curved concave and convex portions. The convex portions of one of the side walls are in register with the concave portions of the opposing side walls so that if these two walls could be moved axially together, they would nest or contact at all points in their adjacent surfaces except where the walls are locally modified in form to provide the piston chamber inlet and exhaust ports B¹⁰ and B¹¹, respectively. In practice, the stator housing or casing may advantageously be formed of two similar parts meeting at the central plane of the piston chamber and secured together as by suitable clamping bolts A². As shown, the two halves of the casing body proper are mounted on and connected to a cradle or base member A³ formed with a seat A³⁰ engaged by the peripheral surface of the stator body.

The outer wall B³ of the piston chamber is cylindrical and the inner wall of the piston chamber comprises cylindrical portions B⁴ varying in their axial dimensions with the convexity and concavity of the adjacent portions of the side walls B' and B². The adjacent edges B⁵ of the opposing portions B⁴ of the inner wall of the piston chamber are separated to provide a circumferential slot through which the rotor body extends into the piston chamber.

The rotor body D may be described as a disc or cylinder-like body which is mounted on the shaft C, and which is chambered or cut away to provide cooling spaces or passages through which air is caused to flow as hereinafter described, and to provide slots or guideways D⁴ extending into the rotor from its periphery and receiving axially movable piston vane members E which extend between the opposite side walls B' and B² of the piston chamber, and between the inner and outer walls B³ and B⁴ of that chamber. As shown, the rotor body is formed of parts D', D² and D³. The parts D' and D², which may be counterparts of one another, are arranged at opposite sides of the central member D³ which is in the form of a disc of metal plate. The parts D', D² and D³ are keyed on the rotor shaft C, and are also secured together by clamping bolts D⁵. Each piston vane pocket or slot D⁴ extends axially through the parts D', D² and D³. Between each pair of piston vane pockets D⁴, the member D' is recessed to form a corresponding air chamber or passage d', and the member D² is recessed to form a similar air space or passage d². The webbed member D³ is cut away to provide restricted ports D²⁰ and D³¹ providing more or less restricted communication between each space or pocket d' to the adjacent space or pocket d².

In the construction shown, air is forced into each chamber d', and into each piston chamber D⁴, by the centrifugal fan effect of curved spoke-like portions D⁶ of the rotor part D' which draw atmospheric air into the rotor through axially extending ports A⁴ in the housing structure. Similar spoke-like portions of the rotor port D², assist in drawing air out of the chambers d² and D⁴ and discharging into the atmosphere through ports A⁵ at the opposite side of the stator housing from the ports A⁴. As shown, the parts D' and D² may be counter-parts, the spoke-like portions D⁶ being so curved that with the intended direction of rotation shown by the arrows in Figs. 1 and 2, the spokes of the member D' will tend to move the air outward from the axis of the stator, whereas the spokes D⁶ of the part D² will tend to draw air inward toward the stator axis.

At their outer ends the spokes or arms are integrally united with heavy annular rib parts D⁷ of the rotor body. These rib parts extend into the slot between the stator edge portions B⁵. To minimize leakage, each rib D⁷ and adjacent stator edge B⁵ have circumferentially extending tongue and groove surfaces ground or otherwise suitably machined to insure a close fit. The ribs D⁷ close short portions of the inner edge of each piston vanes slideway D⁴.

To facilitate high speed operation, for which the invention was primarily devised, the sliding piston members E are advantageously made of strong light-weight material, for example, duralumin, and are advantageously made of two separate plate-like parts E' and E² connected by rivets E³ and spaced apart by lugs E⁴ carried by the plate E' and through which the rivets E³ extend. To minimize leakage through the joints between the piston chamber walls B', B², B³ and B⁴, and the rotor and piston parts, suitable joint sealing provisions are required. As shown, these provisions comprise an L-shaped member G and a U-shaped member H at each end, being located between the plates E' and E². To force the various members G and H axially into contact with the adjacent side walls B' and B², and to force the base member of each arm G into engagement with the corresponding wall portion B⁴, I provide a spring I and a linked structure comprising lever elements J and J'. The spring I, to permit it to fit between the narrow space between the plates E' and E², is advantageously formed of a reversely bent strip or bar of metal. It acts between a lug E⁵ carried by the plate E' adjacent its outer edge, and the linked structure, and tends to expand the latter in the axial direction and thereby cause one arm J at each end of the linked structure to bear axially outward and radially inward against the corresponding member G at the corner of the latter at which the axial and radial portions unite. A second arm J' at each end of the linked structure bears axially against the radially extending portion of the corresponding U-shaped member H. The two arms J and J' adjacent the same side of the piston chamber are pivotally connected, and the two arms J are pivotally connected at their inner ends, and the two arms J' are also pivotally connected at their inner ends.

In operation, the radially extending portions of each of the members G and H tend to prevent leakage between the corresponding end of the corresponding piston member E, and the adjacent side wall B' or B². The base portions of the L-shaped members G tend to prevent leakage between the piston members and the piston chamber walls B⁴. Leakage between the piston wall B³ and the outer edge of each piston member is minimized by the action of the spring on the piston blade through the lug E⁵, since this spring force tends to hold the blade itself in contact with the wall B³. In operation, centrifugal force action on the piston blade and on the U-shaped members H insures additional protection against leakage between the outer edge of each piston blade and the wall B³. An advantage of the particular arrangement described is that centrifugal force tends to neutralize the tension of the spring I and thus diminish the pressure inserted by the members G and H against the side and inner wall of the piston chamber as the engine speed increases, thereby reducing friction at high speed when friction is of especial importance and when the tendency to leakage past the pistons is of reduced importance.

To minimize leakage axially of each piston blade between working chambers at opposite sides of the piston, I have provided a pair of radially extending bar-like devices K received in radially extending slots formed in each side wall of each piston blade slot D⁴, and having projections K' extending through apertures in said side wall into the adjacent rotor cooling chamber space d' or d², into engagement with means for pressing the members K against the adjacent side of the corresponding piston blade E. As shown, the provisions for this purpose comprise a radially disposed helical spring L acting on a toggle mechanism comprising a yoke member M and links N, the spring tending to move the yoke member M radially inward. Each link member N is pivotally connected at one end to an equalizing structure connected to the projections K' of the two adjacent members K, and is pivotally connected at its other end to one end of the yoke member M.

This equalizing structure comprises bar-like parts O and O'. There is a bar O associated with each of the joint sealing members K being secured to the projections K' of the latter. Each link member N is connected to a corresponding bar O' and the ends of the latter engage bearing seats O² in the two bars O associated with the two adjacent joint sealing members K. Each bar O' extends through a corresponding opening in the web member D³, and each spring L and yoke M is located in the web port D³¹. As shown each spring L has its outer end in engagement with a seat formed for the purpose on the portions of the rotor structure which form the outer walls of the corresponding pair of cooling spaces or pockets d and d', and each cross head M is mounted on a radially disposed guide pin M' secured at its outer end to the rotor structure.

The described linked structure forms a a sort of a toggle and the tension of the spring L acts on this toggle in a direction tending to force the various members K each against the corresponding piston E. An advantage of the particular arrangement described is that centrifugal force tends to neutralize the action of the spring L and thus diminish the pressure exerted by the members K against the piston blade E as the speed increases. This tends to reduce friction at high speed where friction is of especial importance and when leakage through the slot D⁴ is of reduced importance.

To better dissipate heat absorbed from the working chambers by the rotor, the latter is formed with heat dissipating ribs D⁸ extending into the pockets or cooling spaces d and d' from the walls of the latter. When cooling of the stator due to heat radiation to the atmosphere is insufficient means may be provided for circulating a cooling fluid, usually water, through cooling fluid passages formed in the stator structure. As shown, this cooling fluid is initially supplied to a chamber A³¹ in the base member A³ through a supply port A³². From the chamber A³¹ the liquid passes through a port or ports A³³ into annular cooling fluid spaces A³⁴ formed one in each of the two parts of the housing body. The passages A³⁴ cool the walls of the parts B' and B², as well as the piston chamber side and peripheral walls. The two passages A³⁴ connect at the top of the structure with a chamber A³⁵ in a cooling fluid discharge connection A³⁶.

As shown in the drawings, the effective area of each inlet port B¹⁰ may be varied by means of an adjustable valve or throat member P. The throat members P are mounted in guideways formed in the stator housing and inclined to the rotor plane of revolution, and may be adjusted by means of stems P' the outer ends of which project from the stator structure. The explosion engine shown in the drawings comprises suitable, and suitably located charge igniting devices Q.

With the apparatus shown in the drawings, the space between the projecting ends of each adjacent pair of sliding piston members E at each side of the rotor constitutes a working chamber $b$, the end walls of which are formed by said piston end portions, the side walls of which are formed by the corresponding side wall portion of the rotor body and the opposing portion of the adjacent piston chamber wall $B'$ or $B^2$, and the inner and outer walls of which are formed by the corresponding portions of the piston chamber walls $B^3$ and $B^4$.

Figure 2:
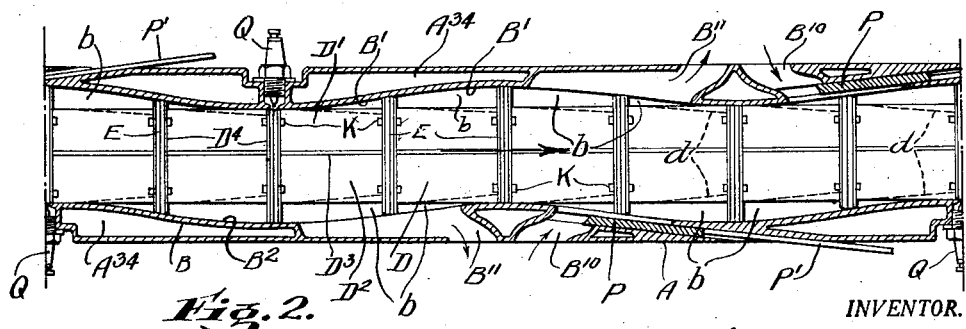
Fig. 2 is a developed circumferential section on the line 2—2 of Fig. 1.

In the intended operation of the particular form of apparatus shown in Figs. 1 to 5, an explosive mixture is drawn into each working chamber $b$ as the latter moves past the corresponding inlet port $B^{10}$. In practice suitable carburetor provisions are associated with each inlet port $B^{10}$, but as provisions suitable for the purpose are well known and their details form no part of the present invention they are not illustrated herein. As each working chamber $b$ after receiving its charge continues to advance, its volume increases in consequence of the inclination of the adjacent portion of the corresponding piston wall chamber $B'$ or $B^2$ away from the rotor and each working chamber is enlarged to its maximum size at or very shortly after the time at which its rear wall, formed by the trailing piston E, passes beyond the front wall of the inlet port. Thereafter the working chamber $b$ begins to diminish in volume thus compressing the charge. As shown in Fig. 2, the maximum compression in each working chamber occurs when, or immediately before, the movement of the rotor brings the front end of the working chamber opposite the charge igniting device Q. The ignition of the charge in each working chamber tends, of course, to a great increase in pressure in the chamber, but the extent to which the pressure is thus increased is reduced in consequence of the expansion in the volume of the working chamber which begins to occur as soon as the piston E forming the front wall of the working chamber moves beyond the ignition device Q. As clearly appears from Fig. 2, each working chamber $b$ is again expanded to its maximum capacity at or about the time when the piston E forming the front wall of the working chamber reaches the outlet port $B^{11}$. The piston E forming the front wall of each working chamber $b$ projects beyond the rotor a greater axial distance than does the piston forming the rear wall of the chamber during the period in which the working chamber volume is expanding after the charge is ignited, and the increase in working chamber pressure resulting from the ignition of the charge thus imparts energy to the rotor tending to maintain the latter in rotation.

In the construction shown in Figs. 1 to 5 there are eight working chambers $b$ at each side of the rotor and the operations occurring in each working chamber are repeated in each of the other fifteen working chambers. With the parts proportioned and arranged as shown, during a single complete rotation of the rotor, each working chamber $b$ is connected to the corresponding inlet port $B^{10}$ during a little less than a quarter of the time required for the rotation; the charge in the working chamber is being compressed during another quarter; is being expanded during a third quarter of the time required for the rotation; and the working chamber is connected to the exhaust port during the remainder of the time required for the rotation. The described arrangement permits the working chambers to exhaust freely, and avoids objectionable wire drawing of the charges. Since admitted to the working chambers the side walls of the rotor are substantially in contact with the convex portions of the piston chamber side walls $B'$ and $B^2$, depressions, pockets or cavities $d$ are advantageously formed in the rotor side walls, one for each working chamber to provide the latter with sufficient volumetric capacity when the chamber is contracted to its minimum size. Each pocket $d$ is wedge-shaped with its blunt or deep end adjacent the forward end, having reference to the direction of rotary movement, of the working chamber to which it pertains. It will be understood, of course, that doubling, trebling, or quadrupling the number of working chambers $b$ and a corresponding increase in the number of inlet and exhaust ports $B^{10}$ and $B^{11}$ and ignition devices Q distributed about the rotor axis does not change the character or mode of operation of the apparatus other than by the multiplication of chambers and ports and the resultant increase in capacity of the engine.

As shown, each piston chamber side wall $B'$ and $B^2$ has each of its alternating convex and concave portions formed of two sections which are alternately inclined at a relatively small angle to the plane of rotor rotation, and which are connected to one another by a portion parallel to said plane into which the inclined portions merge in a gradual manner. The formation of the piston chamber side walls $B'$ and $B^2$ with alternating convex and concave portions shaped as shown, contributes to effective operation with a minimum of shock, friction, and wear. In consequence of the small difference in angle of inclination to the rotor rotation plane, of circumferentially adjacent sections of either side wall $B'$ or $B^2$, the axial movements of each piston member E first in one direction and then in the other, are each initiated and terminated in a very gradual manner. The avoidance of unduly rapid acceleration of each piston member E in any portion of its to and fro movements, obviously contributes to minimize impact and excessive contact pressure between the ends of the piston and the side walls of the piston chamber, and thereby minimizes shock, frictional resistance, and resultant wear and vibration. It will be apparent also that the relatively slow axial acceleration of the pistons tends to prevent separation between their ends and the adjacent walls of the stator and thus directly tend to prevent leakage past the ends of the pistons.

By injecting fuel into each working chamber $b$ at the points at which the devices Q are located, so that the injected fuel passes into a charge of air previously supplied to the chamber through the corresponding inlet port $B^{10}$, and previously compressed in the chamber to produce a temperature and pressure therein at which the fuel injected will ignite, the apparatus shown in Figs. 1 to 5 will operate in a manner analogous to that of an ordinary Diesel engine. For use of the form of apparatus shown in Figs. 1 to 5 as a Diesel engine, the pockets or cavities $d$ in the rotor may advantageously be made shallower than are ordinarily desirable in an explosive engine in which the fuel and air are premixed and are compresed in the working chambers preparatory to ignition.

The apparatus shown in Figs. 1 to 5 may be used as a gas compressor without significant change in form other than in the disposition of the inlet and outlet ports. For such use, as shown in Fig. 6, there may be two exhaust ports X and two inlet ports Y at each side of the rotor D, one exhaust port X being located where the ignition device Q is located in the construction first described, and the other being located 180° therefrom. An inlet port Y is located slightly in advance of each exhaust port, each inlet port advantageously opening to the piston chamber along a circumferential extent thereof which corresponds to the major portion of the corresponding section of the piston chamber side wall which is inclined away from the rotor plane. The rotor pockets or cavities $d$ of the construction first described, may be omitted with the arrangement shown in Fig. 6 when a high compression is desired, and when a lower compression is desired, may be proportioned to the compression required.

To adapt the form of apparatus shown in Figs. 1 to 5 for use as a turbine employing steam, compressed air, or other compressed gas as the motive fluid, two inlet and two exhaust ports are provided at each side of the rotor, one exhaust port X being located substantially as in the construction shown in Figs. 1 to 5, and the other exhaust port being 180° therefrom as shown in Fig. 7. One inlet port Y is located substantially where the ignition device Q is located in the construction first described, and the other inlet port at the same side of the turbine is located 180° therefrom. In general, in the use of the apparatus as a turbine, it is unnecessary to employ stator or rotor cooling provisions unless the compressed air or gas forming the motive fluid is supplied at high temperature.

To adapt apparatus of the form and character shown in Figs. 1 to 5 for use as a liquid pump, two inlet ports Y and two exhaust ports X are provided at each side of the rotor as shown in Fig. 8. An inlet port Y opens to the piston chamber through each portion of the corresponding side wall of the piston chamber which is inclined away from the rotor plane of rotation, and an exhaust port X opens through each portion of the side wall which is inclined toward the plane of rotor rotation as is shown in Fig. 8. In general, no stator cooling provisions are required in the use of the apparatus as a liquid pump, and for such use the rotor pumps or cavities $d$ may be eliminated.

It will be understood of course, that in all forms of the invention, it is essential in general that inlet and outlet ports at one side of the apparatus be separated in a circumferential direction by a distance not less, and usually slightly greater than the distance between an adjacent pair of sliding pistons E.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims; and that in some cases certain features of my invention may be used to advantage without a corresponding use of other features.

Having now described my invention what I claim as new and desire to secure by Letters Patent, is:—

1. In a rotary engine, a rotory comprising an annular rotor body formed of two side parts and a central web part, said body being formed with slots to receive axially movable piston members, each of said side parts being chambered to form a cooling fluid space between each adjacent pair of said slots and being formed with a port through which said space opens to the atmosphere adjacent the axis of said body, and said central web part being ported to connect the side by side chambers in the two side members, and two sets of fan parts, one set at one side of the web part and tending to move air radially outward, and the other set at the other side of said web part and tending to move air radially inward.

2. In a rotary engine, a rotor formed with axially extending piston guideways and with cooling fluid passages communicating with said guideways at the inner edges of the latter, and means for passing a cooling fluid through said passages.

3. In a rotary engine comprising a rotor and a stator formed with an annular piston chamber co-axial with said rotor and into which the latter extends, the side walls of said piston chamber being circumferentially undulatory and said rotor being formed with axially extending piston guideways, piston members mounted in said guideways and extending between the side walls of said piston chamber and between the inner and outer walls thereof, and means for preventing leakage between said piston members and walls comprising side by side members mounted in each piston member at each end thereof and each comprising a radially extending portion and an axially extending portion, the axially extending portion of one, engaging the inner wall of the piston chamber, and the axially extending portion of another of the members at one end of each piston engaging the outer wall of the piston chamber, and means located within the piston for forcing both of the last mentioned members against the adjacent side piston chamber side wall, and for forcing said one member radially inward against the inner wall of the piston chamber.

4. In a rotary engine comprising a rotor and a stator formed with an annular piston chamber co-axial with said rotor and into which the latter extends, the side walls of said piston chamber being circumferentially undulatory and said rotor being formed with axially extending piston guideways, piston members mounted in said guideways and extending between the side walls of said piston chamber and between the inner and outer walls thereof, and means for preventing leakage between said piston members and walls comprising side by side members mounted in each piston member at each end thereof and each comprising a radially extending portion and an axially extending portion, the axially extending portion of one, engaging the inner wall of the piston chamber, and the axially extending portion of another of the members at one end of each engaging the outer wall of the piston chamber, and means located within the piston for forcing both of the last mentioned members against the adjacent side piston chamber side wall, and for forcing said one member radially inward against the inner wall of the piston chamber, said means comprising a resilient device the tension of which is affected by a centrifugal force and diminishes as the engine speed increases.

5. In a rotary engine comprising a rotor and a stator formed with an annular piston chamber co-axial with said rotor and into which the latter extends, the side walls of said piston chamber being circumferentially undulatory and said rotor being formed with axially extending piston guideways and piston members mounted in said guideways and extending between the side walls of said piston chamber and between the inner and outer walls thereof, and means for preventing leakage past said piston members comprising joint sealing members mounted in said rotor, and means also mounted in said rotor for forcing said joint sealing members into a joint sealing position, said means including a resilient device, the tension of which is affected by a centrifugal force action and diminishes as the engine speed increases.

6. In a rotor engine comprising a rotor, a stator formed with an annular piston chamber co-axial with said rotor and into which the latter extends, the said walls of said piston chamber being circumferentially undulatory and said rotor being formed with axially extending piston guideways and with radially extending slots in the side walls of said guideways, piston members mounted in said guideways and extending between the side walls of said piston chamber, and means for preventing leakage between the piston members and the walls of said guideways comprising a joint sealing member mounted in each of said slots and means for yieldingly pressing each of said joint sealing members into engagement with the corresponding piston, and means comprising a toggle connection between joint sealing members in adjacent guideways and a spring acting on said toggle mechanism.

7. In a rotor engine comprising a rotor, a stator formed with an annular piston chamber co-axial with said rotor and into which the latter extends, the said walls of said piston chamber being circumferentially undulatory and said rotor being formed with axially extending piston guideways and with radially extending slots in the side walls of said guideways, piston members mounted in said guideways and extending between the side walls of said piston chamber, and means for preventing leakage between the piston members and the walls of said guideways comprising a joint sealing member mounted in each of said slots and means for yieldingly pressing each of said joint sealing members into engagement with the corresponding piston, said means comprising a toggle connection between joint sealing members in adjacent guideways and a spring acting on said toggle mechanism and subjected to a centrifugal force action diminishing the tension of said spring as the engine speed increases.

8. In a rotary engine comprising a rotor and a stator formed with an annular piston chamber co-axial with said rotor and into which the latter extends, the side walls of said piston chamber being circumferentially undulatory and said rotor being formed with axially extending piston guideways, piston members mounted in said guideways and extending between the side walls of said piston chamber and between the inner and outer walls thereof, and means for preventing leakage between said piston members and said walls comprising joint sealing members mounted in each piston member and means for subjecting said joint sealing members to an axial force and to a radial force comprising a toggle like structure mounted in each piston member and acting between joint sealing members at opposite ends thereof, and a radially disposed spring acting between said rotor and toggle structure.

9. In a rotary engine comprising a rotor and a stator formed with an annular piston chamber co-axial with said rotor and into which the latter extends, the side walls of said piston chamber being circumferentially undulatory and said rotor being formed with axially extending piston guideways, piston members mounted in said guideways and extending between the side walls of said piston chamber and between the inner and outer walls thereof, and means for preventing leakage between said piston members and said walls comprising joint sealing members mounted in each piston member and means for subjecting said joint sealing members to an axial force and to a radial force comprising a toggle like structure mounted in each piston member and acting between joint sealing members at opposite ends thereof, and a radially disposed spring acting between said rotor and toggle structure and arranged to have its tension diminished by a centrifugal force action.

10. In a rotary engine comprising a rotor, a stator formed with an annular piston chamber coaxial with said rotor and into which the latter extends, the side walls of said piston chamber being circumferentially undulatory and said rotor being formed with axially extending piston guide-ways, piston members mounted in said guide-ways and extending between the side walls of said piston chamber, and means for preventing leakage between the piston chambers and the walls of said guide-ways comprising joint sealing members and means for yieldingly pressing each of said joint sealing members into engagement with the corresponding piston, said means including a part subjected to centrifugal force action and tending to diminish the pressure of contact between said member and piston as the rotative speed of the rotor increases.

Signed at New York city, in the county of New York and State of New York, this 30th day of November, A. D. 1928.

LESLIE MILTON WOLF.